Aug. 1, 1939.   N. ETHIER   2,168,120
MEAT TENDERER
Filed Sept. 21, 1937
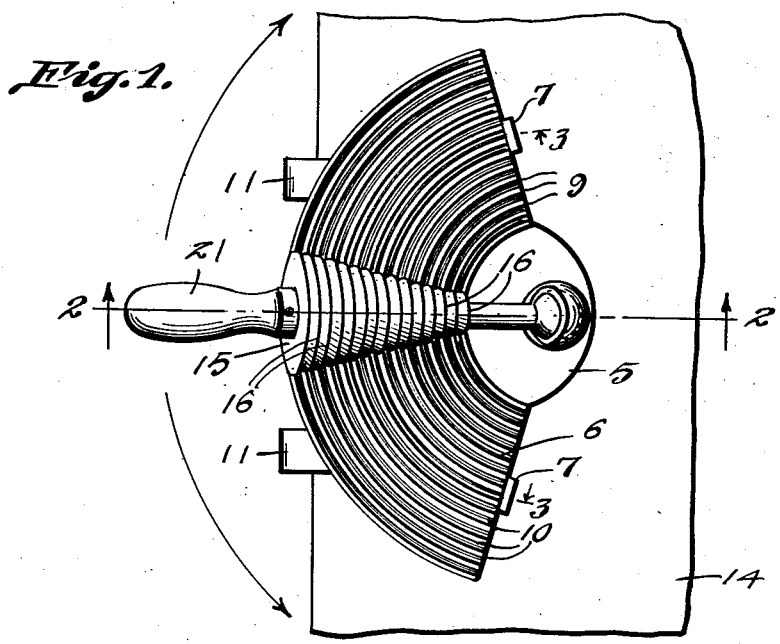
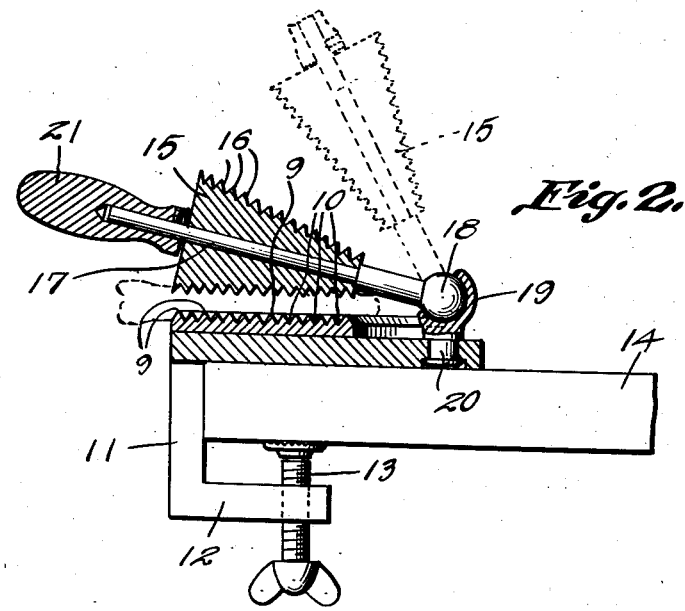
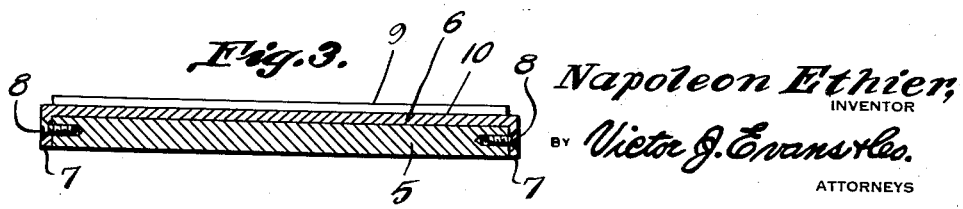
Napoleon Ethier,
INVENTOR
BY Victor J. Evans & Co.
ATTORNEYS Patented Aug. 1, 1939

2,168,120

UNITED STATES PATENT OFFICE 2,168,120

MEAT TENDERER

Napoleon Ethier, Maniwaki, Quebec, Canada

Application September 21, 1937, Serial No. 164,941

1 Claim. (Cl. 17—27)

My invention relates to new and novel improvements in premasticating devices and more particularly to that class known as meat tenderers.

One of the principal objects of my invention is to provide a meat tenderer designed to effectively tenderize meat operated on thereby to render the same more digestible without excessive mastication.

Another object of my invention is to provide a device of the above described character which is simple in operation, effective in use and economical in manufacture.

Other objects and advantages will be apparent from the following description, appended claim and annexed drawing.

Referring to the drawing wherein like reference characters designate like parts throughout the several views:

Fig. 1 is a top plan view of my invention.

Fig. 2 is a sectional view taken on a line 2—2 of Fig. 1.

Fig. 3 is a sectional view of the base taken on the line 3—3 of Fig. 1.

In teaching my invention, I provide a base 5 of substantial segment-shaped configuration fashioned with a plate 6 having depending lugs 7 engaging the plane surfaces of the base. Suitable screws 8 operable within said lugs secure the plate to the base.

The plate 6 is formed on the upper surface thereof with a plurality of coextending arcuate teeth 9 forming similar shaped grooves 10 therebetween.

The base 5 is formed at the outer peripheral edge thereof with depending lugs 11 having offset sections 12 in which are threaded clamping screws 13 for clamping the base to a table top 14 or other suitable supporting means, as clearly illustrated in Fig. 2 of the drawing.

A lacerating member, comprising a frustum-shaped roller 15 formed with circumferentially extending teeth 16, is positioned above the plate 6 and secured to the base for relative movement therewith by a suitable connecting means. Said suitable connecting means comprises a shaft 17, on which the roller 15 is rotatably mounted, formed with a ball 18 at one end thereof seated within a socket 19 pivotally connected to the base as at 20. The shaft 17, between the roller 15 and ball 18, is enlarged to prevent axial movement of the roller towards the ball, thereby maintaining registry of the teeth 16 with the grooves 10. Axial movement of the roller in the opposite direction is prevented by means of an operating handle or hand-piece 21 secured on the opposite end of the shaft 17.

The ball 18 and socket 19 form a ball and socket connection between the shaft 17 and base 5, thus permitting a swivel movement to be imparted to the roller 15.

Obviously, meat interposed between the plate 6 and roller 15 is worked on to tenderize the same by the coaction of the teeth 9 and 16, the roller 15 being rotated about the shaft 17 during the movement of the shaft over the orbit about the ball and socket connection. The ball and socket connection, while permitting circular travel of the roller over the plate 6, also permits the same to be raised above the plate a sufficient distance to permit the insertion of meat between the roller and plate and the removal of the same therefrom.

From the foregoing, it will be apparent that when meat is placed on the plate and the shaft oscillated, the teeth on the roller will coact with the teeth of the plate to effectively lacerate or mangle the meat. It is to be noted in the operation, that the roller is caused to rotate about the shaft 17 due to the engagement with the meat caused by pressure exerted on the handle and that the same also travels in a circular path or orbit over the area of the meat being treated and that the teeth of the roller are maintained within registry with the grooves in the plate during such operation. The amount of pressure applied on the handle during the lacerating operation governs the degree of tenderization obtained.

Having described my invention, what I claim is:

A device of the character described, comprising a stationary base, a sector shaped plate fixed to said base and formed with arcuate grooves and a concave end, a ball and socket joint pivotally mounted on said base adjacent the concave end of said plate, a shaft connected to said joint for oscillatory movement over a path extending above and in parallelism with the upper face of said plate and angularly disposed relative to the latter, and a frustum shaped roller rotatably mounted on said shaft and formed with circumferentially extending teeth for registry with said grooves for coacting with the latter to tenderize meat and the like interposed between said roller and plate when said shaft and roller are oscillated and said roller rotated.

NAPOLEON ETHIER.